Jan. 16, 1962　　　H. R. MALLORY　　　3,017,559
INVERTER-CHARGER CIRCUIT
Filed Jan. 9, 1958　　　　　　　　　　　　　　2 Sheets-Sheet 1
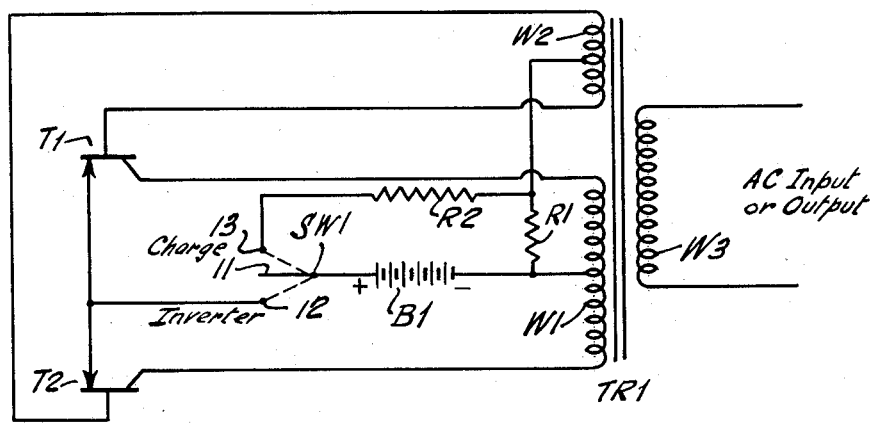
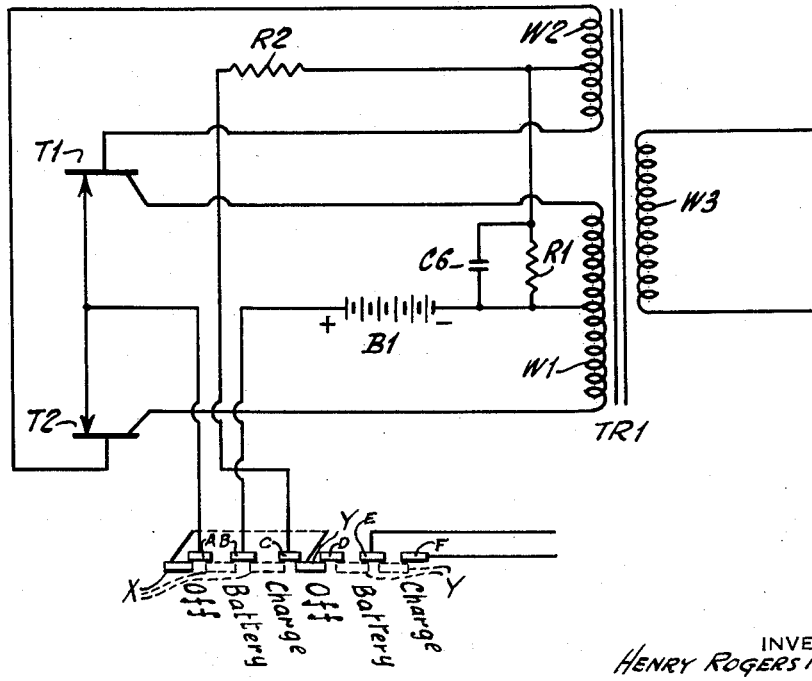
INVENTOR
HENRY ROGERS MALLORY
BY
*I. Jordan Kunik*
ATTORNEY

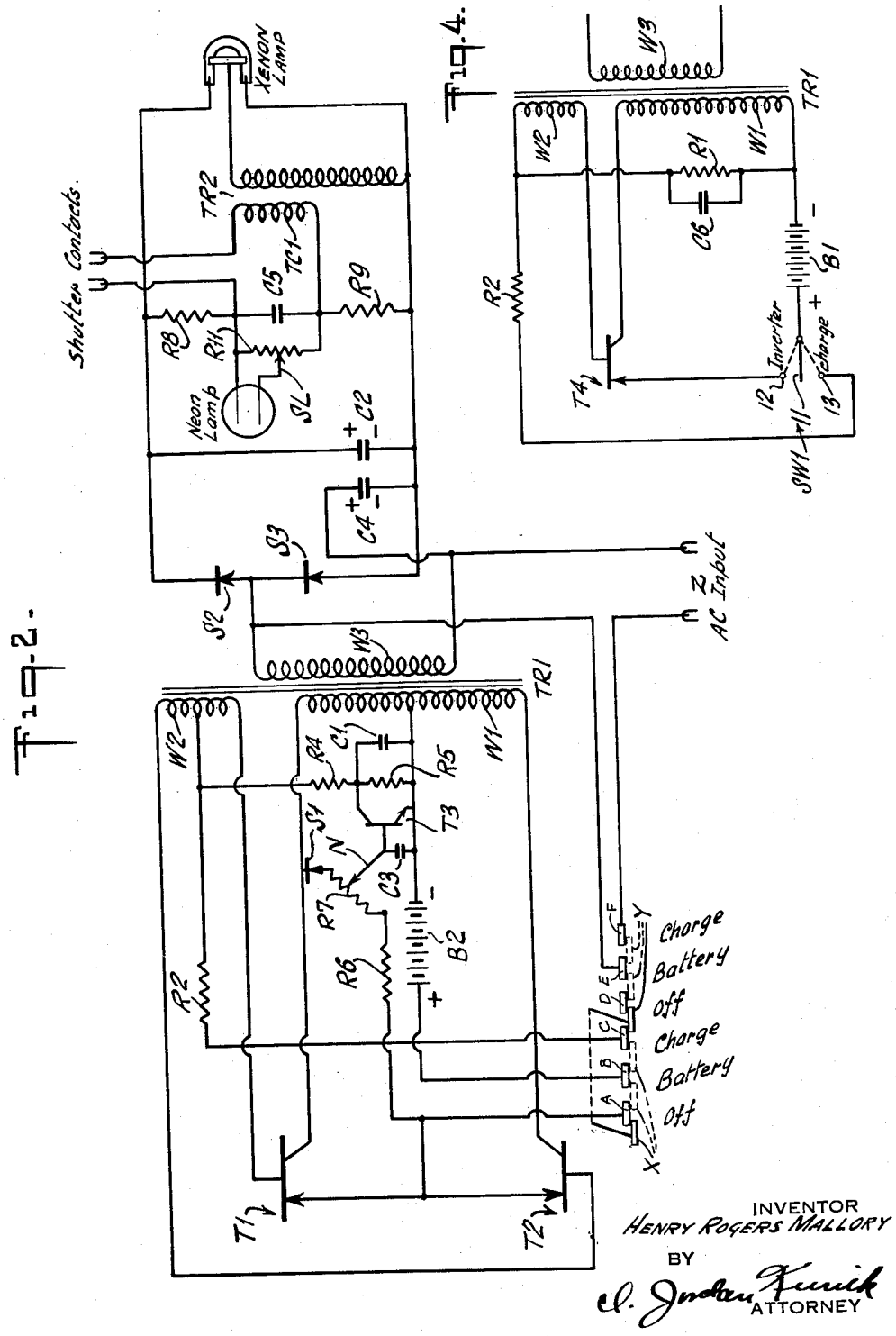

United States Patent Office
3,017,559
Patented Jan. 16, 1962

3,017,559
INVERTER-CHARGER CIRCUIT
Henry Rogers Mallory, Greenwich, Conn., assignor to P. R. Mallory & Co. Inc., Indianapolis, Ind., a corporation of Delaware
Filed Jan. 9, 1958, Ser. No. 707,909
22 Claims. (Cl. 321—45)

This invention relates to transistor power inverter circuits, and particularly to combination circuits which alternately perform the functions of charging a battery and of inverting its direct current output for alternating current purposes.

The circuits of the present invention employ transistor inverters to convert low voltage direct current to alternating current, or to higher voltage direct current, the outputs being utilized to operate photoflash equipment, radio, television and electronic equipment, or the like. If secondary batteries are used, they must be recharged from time to time, and I provide a novel circuit arrangement which permits the charging of the batteries or cells from the oscillator or inverter transformer, utilizing the transistors in the circuits as rectifiers. A simple switch arrangement is required to change the circuit from an inverter to a battery charger, and vice versa. Since various elements in the circuit are utilized for both inverting and charging functions, considerable economies in size and weight are realized in construction of various types of equipment. The same circuit arrangement may also be used to rejuvenate certain types of primary batteries as well as secondary batteries.

Still other objects and advantages of my invention will be apparent from the specification.

The features of novelty which I believe to be characteristic of my invention are set forth herein and will best be understood, both as to their fundamental principles and as to their particular embodiments, by reference to the specification and accompanying drawings, in which:

FIGURE 1 is a wiring diagram of the transistor inverter-charger circuit of the present invention;

FIG. 2 is a further modification of the transistor inverter-charger circuit operating in conjunction with a wiring diagram of a typical electronic flash apparatus for photography;

FIG. 3 is a wiring diagram of a modification of the diagram shown in FIG. 1, together with added control elements; and FIG. 4 is a wiring diagram of an alternative embodiment of the inverter-charger circuit contemplated by the present invention.

Referring now to the drawings in detail, wherein like reference numerals in the figures refer to equivalent or similar components, the general concept of the inverter-charger circuit of the present invention is exemplified in FIG. 1, and comprises a pair of PNP transistors T1 and T2, whose collectors are connected, respectively, to the respective ends of a suitable load, such as winding W1 of transformer TR1. The bases of said transistors are connected to the respective ends of winding W2 of transformer TR1, and this circuit oscillates in the manner well known in the art.

Connected between the center taps respectively of windings W1 and W2, is a feedback return network comprising resistor R1. Connected also to the center tap of winding W1 is a secondary battery B1 comprising a suitable number of cells. The positive side of battery B1 is connectible through contact arm 11 of switch SW1 and contact terminal 12 to a common connection between the emitters of transistors T1 and T2. Although resistor R1 may be returned to the emitter return side (+) of the battery, it may be preferable to have said resistor connected to the collector return side (−) of the battery, as shown in FIG. 1, so that the oscillator is then self-starting under most any condition of alternating current load.

When switch SW1 is connected to contact 12, the circuit described thus far performs as an invertor or power oscillator as well known in the art whereby the D.C. current from battery B1 is inverted to alternating current by transistors T1 and T2 and is transformed through transformer TR1 and winding W3 into an alternating current output.

The circuit described up to this point may be converted into a full wave, center tapped transformer rectifier type battery charger by connecting one end of charge control resistor R2 between one end of resistor R1 and the center tap connection of winding W2. The other end of resistor R2 is connected to contact 13 of switch SW1. When arm 11 of switch SW1 connects the positive side of battery B1 to contact 13, and an alternating current input is applied to winding W3 of transformer TR1, the circuit shown in FIG. 1 becomes a battery charger. In this function, the respective collector and base transformer windings for transistors T1 and T2 are additive in phase.

In the charge position of switch SW1, the charge circuit is completed from the negative side of the battery through secondary winding W1 of transformer TR1, through the respective collector-base junctions of transistors T1 and T2, through winding W2, through charge control resistor R2, through contact 13 and contact arm 11 of switch SW1 back to the positive side of the battery in the more or less conventional center tap, full wave, rectifier charging circuit well known in the art.

Although two PNP transistors are shown in FIG. 1 as a grounded base, common emitter circuit, single transistor inverter circuits as well as other circuit combinations, such as common collector, common emitter, etc., can be used as the inverter circuit, and with a somewhat different switching arrangement the same charging results can be obtained as described. Although T1 and T2 are shown as PNP transistors, the circuit will work equally well with NPN transistors as T1 and T2 with a reversal of the battery polarity.

FIG. 2 shows a complete wiring diagram of a photoflash device in which a modification of the inverter-charger circuit of the present invention is incorporated. Substantially the same transformer TR1 with windings W1, W2, and W3 are utilized in conjunction with transistors T1 and T2, in the manner described in connection with FIG. 1.

A switch is provided, comprising a ganged pair of spaced apart slide contacts X and Y which are arranged to assume any one of three positions in respect of terminal contacts A, B, C, D, E and F, spaced substantially equidistantly apart. Contacts X and Y move together in a spaced apart relationship in order to perform predetermined switch functions in respect of said terminal contacts. In the "off" position no circuits are completed by either contact X or Y; contact X on terminal A does not close any circuit, while contact Y on terminals C and D does not close any circuit since contact D is a blank.

When contacts X and Y are moved to the position where X bridges terminal contacts A and B, and Y bridges terminal contacts D and E, the instrument is in the inverter condition where power is supplied by the battery to transformer TR1 for operating the electronic flash circuit which will be described hereinbelow. In this "battery" position the circuit is completed from the positive battery terminal to the transistor emitters through terminal conacts A and B. In this condition, contact Y is inoperative since terminal contact D is a blank.

When contacts X and Y bridge contacts B, C and E, F, respectively, and when alternating current plug Z has been inserted into a suitable alternating current receptacle, the A.C. power is connected to the high voltage winding W3 of transformer TR1 through contacts E and F, whereby said winding becomes the transformer primary. In this condition, transformer windings W1 and W2 become the charger secondaries and by rectification through the collector-base junction of transistors T1 and T2, battery B2 is charged through charging rate control resistor R2 and through terminal contacts B and C bridged by contact X.

The type of circuit in this charge position is the well known center tap transformer full wave circuit with the modification that the rectifying action as performed by the collector-base junction of transistors T1 and T2 takes place along the secondary winding instead of at the end of the winding in the conventional sense.

Rectification takes place under charging conditions between the respective bases and collectors of both transistors T1 and T2. The common connection between the emitters of these two transistors has no harmful effect upon the rectifier action of these transistors and it has been found that the emitters can remain tied together.

In order to control the charging rate of the circuit, resistor R2 is connected between the center tap of transformer winding W2 and terminal contact C, the value of said resistor being chosen in accordance with the desired charging characteristics of the circuit. The charging rate can be varied over considerably wide limits by selecting the proper value of resistor R2. In some embodiments resistor R2 may comprise a few ohms, while in others it may be tens of ohms.

In the charging position, transformer windings W1 and W2 are in series and in phase. The additional voltage contributed by transformer winding W2 is necessary in order to provide the requisite voltage for charging the battery which would otherwise be insufficient if supplied only by transformer winding W1.

In electronic flash equipment operating from self-contained batteries, circuit efficiency is of major significance since it determines the number of flashes that may be obtained from a set of batteries. The loading of the flash circuit is variable from practically a short circuit immediately after the lamp has been flashed to an open circuit after the energy storage of "tank" capacitor C2 has been fully charged. In commercial equipment it is a practical necessity that the photoflash "tank" capacitor be recharged promptly, with a recharge time such as ten seconds or less, to approximately 80% or 90% of the maximum capacitor voltage.

In utilizing transistor inverter circuits for electronic flash, the values of the feedback resistor should be relatively small for a fast recharge time. Such low value of this feedback resistor provides a relatively high "idling" or charged tank capacitor current from the battery, and under such conditions the circuit cannot be considered to be operating efficiently.

It is desired, therefore, in electronic flash equipment to vary the value of said feedback resistor. It should be low in resistance for a fast recharge time, and high in resistance for an efficient or low "idling" current. A lower idling current results in more flashes per charge in the case of secondary batteries, or a greater number of flashes when using primary batteries.

A transistor inverter circuit requires some type of feedback return network. In FIG. 2 this feedback return network comprises resistors R4 and R5 connected in series between the respective center taps of transformer windings W1 and W2.

The circuit shown in FIG. 2 accomplishes this desirable objective of fast recharge time and low "idling" current by means of an automatically variable feedback resistance. In order to accomplish this purpose, NPN control transistor T3 is connected across resistor R5 which is in the order of thousands of ohms as compared with resistor R4 whose value is in the tens or hundreds of ohms.

Automatic control of this feedback circuit is obtained by an NPN transistor T3 whose collector is connected to one end of resistor R5 and whose emitter is connected to the other end of said resistor. The automatic control transistor T3 effectively short circuits resistor R5 with its shunt capacitor C1 when the main tank capacitor C2 in the photoflash circuit is discharged.

This automatic control action is obtained by the base current feed circuit of resistors R6, R7, condenser C3 and control rectifier or diode S1. Resistor R6, variable resistor R7 and control rectifier or diode S1 are connected in series between one end of transformer winding W1 and the common connection between the respective emitters of transistors T1 and T2 and the positive end of battery B2 through switch contacts A and B in the switch battery position. Slider N, which controls variable resistor R7 is tied to a common connection between the base of transistor T3 and one side of condenser C3, the other side of which is connected to the negative end of battery B2.

The battery voltage is substantially constant and a relatively constant current is supplied to the base of NPN transistor T3 through slider N from resistor R6 and a portion of resistor R7. Resistor R7 is variable in order to accommodate variations in the operating characteristics of transistor T3.

Upon starting the apparatus or after a flash, NPN control transistor T3 is saturated by the base current of proper magnitude and polarity as provided by resistors R6 and a portion of R7 from the positive terminal of the battery. As the circuit continues to operate, and as tank capacitor C2 becomes charged, more voltage is developed across the primary windings W1, W2 of the inverter transformer. Some of this voltage is rectified by rectifier S1 in series with resistor R7 and opposes the current flowing into the base of transistor T3 from resistor R6. The electrolytic capacitor C3 smooths out the ripple of the base circuit of transistor T3. When resistors R6 and R7 are adjusted properly, transistor T3 will be saturated under starting and flash conditions, and will become unsaturated or represent a relatively high impedance under "idling" conditions. Under starting or flash conditions transistor T3 effectively shorts out resistor R5. Under "idling" conditions transistor T3 has a high impedance whereby resistor R5 is "unshorted." By this means automatic control over the transistor inverter circuit is achieved by including a variable load transistor T3 in the circuit.

As energy storage or "tank" condenser C2 charges up, a higher alternating current voltage will appear across transformer winding W1 as the loading of transformer winding W3 diminishes. Half of the voltage across transformer winding W1 is rectified through rectifier S1 and appears as a current across the portion of resistor R7 adjacent rectifier S1 in a polarity to counteract the current flowing from battery B2 through resistor R6 and that portion of resistor R7 adjacent resistor R6.

With the proper setting of slider N on resistor R7 and with essentially no load on transformer winding W3 when photoflash capacitor C3 has been charged up, the base current into transistor T3 should be a minimum, or of opposite polarity, so that the emitter collector impedance of transistor T3 is very high. Under these conditions, transistor T3 acts essentially as an open circuit, and the feedback return circuit feeds resistors R4 and R5, the latter having a relatively high value.

Various types of batteries may be utilized in the circuit. In one embodiment for a photoflash apparatus, battery B2 is an hermetically sealed, nickel cadmium battery consisting of six cells of a half ampere hour capacity and having a voltage of approximately 7 volts.

The photoflash circuit that is connected to the charger-inverter circuit described herein comprises a voltage doubler circuit as shown in FIG. 2, although a singler or a tripler circuit could very well be used. The voltage doubler circuit consists of rectifier S2 and S3 and a tank capacitor C2. Rectifier S2 is connected between one end of transformer winding W3 and one electrode of the xenon lamp. Rectifier S3 is connected between the same end of transformer winding W3 and the other electrode of said lamp. The negative terminal of "tank" condenser C2 is connected to rectifier S3 and the negative electrode of the xenon lamp. The other positive terminal of "tank" condenser C2 is connected to rectifier S2 and the positive electrode of the xenon lamp.

Capacitor C4 is a voltage doubler capacitor and completes the voltage doubler circuit as is well known in the art. Negative terminal of condenser C4 is connected to the negative terminal of the xenon lamp and to the negative terminal of rectifier S3, whose positive terminal is connected to one end of transformer winding W3. The positive terminal of condenser C4 is connected to the other end of transformer winding W3, and to one terminal of A.C. plug Z.

One of a pair of camera shutter contacts is connected to a trigger coil TC1 of a trigger transformer TR2. The other one of said shutter contacts is connected to a trigger capacitor C4. Trigger capacitor C5 is charged from the approximate 300 volts of the voltage doubler through resistors R8 and R9 connected to the respective sides of said capacitor, said resistors being connected to rectifier S2 and S3, respectively, as well as to "tank" capacitor C2 and the respective electrodes of the xenon lamp. Resistors R8 and R9 have sufficiently high value as to prevent any electrical shock to the operator holding the camera assembly, since one side of the shutter contacts is invariably grounded to the camera body. In some embodiments, resistor R8 and R9 may each have a value of ½ megohm.

Resistor R11 is in shunt with the trigger capacitor C5 and serves two functions, namely: (1) to reduce the voltage appearing across capacitor C5 to approximately 150 volts, or half the doubler voltage; and (2) to provide a potentiometer for adjusting the voltage to neon indicator which serves as a "ready" light to signal that capacitor C2 is substantially charged up and ready to take pictures. Potentiometer slider SL is connected to one electrode of neon indicator tube, the other electrode of which is connected to one end of resistor R8. Trigger transformer TR2 provides a high voltage pulse to initiate conduction of the xenon lamp in a manner well known in the art. The trigger electrode for said lamp comprises a transparent conductive deposited on the outerside of the lamp envelope. This trigger mechanism is typical of any number of similar mechanisms which work as condenser discharge pulse systems.

In some embodiments, the inverter circuit of FIG. 1 may be modified in the manner shown in FIG. 3, by the addition of a capacitor C6 shunting resistor R1, operating as a resonant feedback return network, thereby improving the operation of the circuit under conditions of inversion while substantially no effect is produced upon the operation of the circuit under charging conditions. The switching components in FIG. 3 are comparable to those shown and described in connection with FIG. 2.

The microfarad value of capacitor C6 is selected to present to the circuit a time constant in combination with R1 approximately equal to the frequency of oscillation. Furthermore, the addition of the correct value of capacitor C6 in shunt with R1 increases the frequency of oscillation which increases the efficiency of the circuit because of the lower core losses of transformer TR1 at the higher frequencies. The resonant feedback return circuit as described above increases the efficiency of the power inversion circuit regardless of the type of load connected to the power inverter.

An alternative embodiment of the inverter-charger circuit is illustrated in FIG. 4, wherein a single transistor T4 is employed in lieu of the two transistors shown in FIG. 3. The circuit performs in a manner similar to that described in detail in FIG. 3. When switch SW1 is in the inverter position, the positive side of the battery is closed to the emitter of transistor T4, and the circuit oscillates in a manner well known in the art.

As distinguished from the illustrations in FIGS. 1 and 3, the collector of transistor T4 is connected to one end of winding W1 and its base electrode is connected to one end of winding W2. The other end of winding W1 is connected to the negative terminal of the battery, while the other end of winding W2 is also connected through feedback network R1 shunted with C6 to the negative terminal of the battery.

In the charge position of switch SW1, battery B1 obtains a charge by virtue of its connection of its negative terminal through winding W1 through the base collector junction of transistor T4, through winding W2, through charge control resistor R2, back to the positive terminal of the battery according to a more or less conventional half wave rectifier circuit well known in the art.

It is contemplated within the purview of the present invention that the feedback networks described herein are a few of many possible combinations that could be equally well used. Although the inverter circuit shown in FIGS. 1, 2, 3 and 4 all utilize magnetic feedback, other types of feedback systems and networks, such as, for instance, capacitive feedback, are also useful.

It is also contemplated where the use of a battery has been illustrated and described herein, that it is intended that equivalent D.C. power supplies may be substituted therefor, such as: a battery paralleled with a D.C. generator; a D.C. generator without a battery connected in parallel with it; a rectifier power supply operating from an A.C. source such as commonly found in radio and televsion receivers; a solar energy converter; a thermopile, and the like.

In the specification, I have explained the principles of my invention, and the best mode in which I have contemplated applying those principles, so as to distinguish my invention from other inventions; and I have particularly pointed out and distinctly claimed the part, mode or combination which I claim as my invention or discovery.

While I have shown and described certain preferred embodiments of my invention, it will be understood that modifications and changes may be made without departing from the function and scope thereof, as will be clear to those skilled in the art.

I claim:

1. An inverter-charger circuit comprising first and second transistors each having a base electrode, an emitter electrode and a collector electrode, the emitters of both of said transistors being connected to each other, a transformer having a first winding, a second winding and a third winding, the collector of said first transistor being connected to one end of said first winding and the collector of said second transistor being connected to the other end of said first winding, the base of said first transistor being connected to one end of said second winding and the base of said second transistor being connected to the other end of said second winding, a resistor connected between the respective center taps of said first and second windings, a battery connected at one end to the center tap of said first winding, a switch having a contact arm and two poles, said contact arm being connected to the other end of said battery, the first of said poles being connected to the center tap of said second winding, the second of said poles being connected to the common connection between said emitters, said contact arm when in contact with said first pole and with an alternating current input introduced into said third winding causing said circuit to charge said battery, said contact arm when in contact with said second pole being operative to cause said circuit to invert the direct current of said battery into an alternating current output upon said third winding.

2. An inverter-charger circuit according to claim 1, and further comprising a second resistor connected between the center tap of said second winding and said first switch pole.

3. An inverter-charger circuit according to claim 2, and further comprising a condenser shunting said first mentioned resistor.

4. An inverter-charger circuit according to claim 3, and further comprising a third transistor, the collector of said third transistor connected to one end of said first resistor, the emitter of said third transistor being connected to the other end of said first resistor, a variable resistor connected between one end of said first winding and the common connection between the emitters of said first two transistors, the slider of said variable resistor being connected to the base of said third transistor.

5. An inverter-charger circuit according to claim 4, and further comprising a second capacitor connected between the base of said third transistor and one end of said battery.

6. An inverter-charger circuit according to claim 5, and further comprising a rectifier connected between one end of said variable resistor and the end of said first winding.

7. A circuit comprising a D.C. power source, at least one transistor having three elements, a switch operative alternately to connect one end of said source to either of any two of said three elements of said transistor, a load, and a feedback network, one end of said network being connected both to said load and to the third element of said transistor, the other end of said feedback network being connected to one of said two elements of said transistor, said load being connected between the third element of said transistor and the other end of said source.

8. A circuit according to claim 7 wherein said load comprises a transformer.

9. A circuit comprising a D.C. power source, at least one transistor having three elements, a switch operative alternately to connect one end of said power source to either of any two of said three elements of said transistor, a load, a feedback network, one end of said network being connected to said load and to the third element of said transistor, the other end of said network being connected to one of said two elements of said transistor, and a charge control circuit, one end of said circuit being connected to said load and the other end of said circuit being connectible through said switch to said first mentioned end of said power source, said load being connected between the third element of said transistor and the other end of said power source.

10. A circuit according to claim 9 wherein said load comprises a transformer.

11. A circuit comprising a battery, a load, at least one transistor having three elements, feedback means, one end of said feedback means being connected to said load and to one of the three elements of said transistor, the other end of said feedback means being connected to one of the other two elements of said transistor, and a switch operative alternately to connect one end of said battery to either of any two of said three elements of said transistor, said load being connected between the third element of said transistor and the other end of said battery, whereby in one position of said switch the circuit operates as a battery charger and in the other position of said switch the circuit operates as a power inverter.

12. A circuit according to claim 11 wherein said load comprises a transformer, said transformer being common to the battery charging circuit and to the power inverter circuit.

13. A circuit according to claim 12 wherein said transformer is divided into a power portion and a feedback portion, and further comprising a feedback return resistor connected between said feedback portion of said transformer and said other end of said battery, and a charge control resistor connected between said feedback portion of said transformer and said switch.

14. A circuit comprising a battery, at least one transistor having three elements, a load, feedback means, one end of said feedback means being connected to said load and to one of the three elements of said transistor, the other end of said feedback means being connected to one of the other two elements of said transistor, a switch operative alternately to connect one end of said battery to either of any selected two elements of said three elements of said transistor, a transformer, a feedback return resistor connected between said transformer and the other end of said battery, and a charge control resistor connected between said transformer and connectible through said switch to said one end of said battery, the third element of said transistor being connected through said transformer to said other end of said battery.

15. A circuit comprising a battery, a load, a pair of transistors, each of said transistors having an emitter element, a collector element and a base element, feedback means, one end of said feedback means being connected to both of said base elements, the other end of said feedback means being connected to either one of the respective emitters and collectors, and a switch operative alternately to connect one end of said battery to either of any two of said similar transistor elements whereby in one position of said switch the circuit operates as a battery charger and in the other position of said switch the circuit operates as a power inverter, both of the third similar elements of said transistors being connected to the other end of said battery through said load.

16. A circuit according to claim 15 wherein said load comprises a transformer, said transformer being common to the battery charging circuit and to the power inverter circuit.

17. A circuit according to claim 16 wherein said transformer is divided into a power portion and a feedback portion, and further comprising a feedback return resistor connected between said feedback portion of said transformer and the other end of said battery, and a charge control resistor connected between said feedback portion of said transformer and said switch.

18. A circuit according to claim 17 and further comprising a shunt capacitor connected across said feedback resistor, said shunt capacitor and feedback return resistor forming a resonant return circuit of the same order of frequency as the oscillating frequency of the complete circuit.

19. A circuit according to claim 18, and further comprising a third transistor having three elements, two of the elements of said third transistor being connected across said feedback return resistor and the third element of said third transistor being connected to said other end of said battery.

20. A circuit according to claim 19, and further comprising a variable resistor connected between said third element of said third transistor and said switch.

21. A circuit according to claim 20, and further comprising a condenser connected between said third element of said third transistor and said other end of said battery.

22. A circuit comprising a D.C. power source, at least one transistor having three elements, a switch operative to connect one end of said source to either of any two of said three elements of said transistor, a load, and a feedback network, one end of said network being connected both to said load and to the other end of said source, the other end of said network being coupled to the third element of said transistor, said load being connected between the third element of said transistor and said other end of said source.

References Cited in the file of this patent

UNITED STATES PATENTS

| | | |
|---|---|---|
| 2,423,646 | Flippen et al. | July 8, 1947 |
| 2,505,185 | Housman | Apr. 25, 1950 |
| 2,555,630 | Bishner | June 5, 1951 |
| 2,783,380 | Bonn | Feb. 26, 1957 |
| 2,783,384 | Bright et al. | Feb. 26, 1957 |
| 2,817,761 | Hollmann | Dec. 24, 1957 |
| 2,843,815 | Driver | July 15, 1958 |
| 2,951,994 | Noordanus et al. | Sept. 6, 1960 |

OTHER REFERENCES

"Transistor Power Supplies," by L. H. Light, published by Wireless World (December 1955), pages 582–586 are relied on.